United States Patent
Montemagno et al.

(10) Patent No.: US 8,647,853 B2
(45) Date of Patent: Feb. 11, 2014

(54) FOAM MICROREACTOR FOR MULTI-PHASE SHEAR-SENSITIVE REACTIONS

(75) Inventors: Carlo Montemagno, Glendale, OH (US); David Wendell, Cincinnati, OH (US); Hyo-Jick Choi, Cincinnati, OH (US)

(73) Assignee: Ensovi, LLC, Dallas, TX (US)

( * ) Notice: Subject to any disclaimer, the term of this patent is extended or adjusted under 35 U.S.C. 154(b) by 0 days.

(21) Appl. No.: 13/446,880

(22) Filed: Apr. 13, 2012

(65) Prior Publication Data

US 2012/0264185 A1 Oct. 18, 2012
US 2013/0316427 A9 Nov. 28, 2013

Related U.S. Application Data

(63) Continuation-in-part of application No. PCT/US2010/060610, filed on Dec. 15, 2010.

(60) Provisional application No. 61/476,164, filed on Apr. 15, 2011, provisional application No. 61/286,578, filed on Dec. 15, 2009.

(51) Int. Cl.
  *B01F 17/00* (2006.01)
  *C07K 14/435* (2006.01)
  *B01J 10/02* (2006.01)
  *A01N 63/02* (2006.01)

(52) U.S. Cl.
  USPC ............ 435/168; 435/41; 435/262; 435/266; 435/274; 435/317.1

(58) Field of Classification Search
  None
  See application file for complete search history.

(56) References Cited

U.S. PATENT DOCUMENTS

| | | |
|---|---|---|
| 7,208,089 B2 | 4/2007 | Montemagno |
| 8,043,848 B2 | 10/2011 | Yamasaki |
| 8,114,356 B2 | 2/2012 | Wonders |
| 2001/0034432 A1 | 10/2001 | Sodroski |
| 2004/0049230 A1 | 3/2004 | Montemagno |
| 2004/0242770 A1 | 12/2004 | Feldstein |
| 2006/0183166 A1 | 8/2006 | Mayer |
| 2007/0087328 A1 | 4/2007 | Sieytr |
| 2008/0317840 A1 | 12/2008 | Lee |
| 2011/0259815 A1 | 10/2011 | Montemagno |
| 2012/0043275 A1 | 2/2012 | Montemagno |

FOREIGN PATENT DOCUMENTS

| | | |
|---|---|---|
| WO | 2004/101447 | 11/2004 |
| WO | WO 2006089245 A2 * | 8/2006 |
| WO | 2006/122566 | 11/2006 |
| WO | 2011/084540 | 7/2011 |

OTHER PUBLICATIONS

Wendell, David; et al; "Artificial Photosynthesis in Ranaspumin-2 Based Foam" Nanoletters, 10, 3231-3236, 2010.*
Elias, C.B; Joshi, JB; "Role of Hydrodynamic Shear on Activity and Structure of Proteins" Advances in Biochemical Engineering, 59, 47-71.*
Liu, et al., "Hierarchical self-assembling of dendritic-linear diblock complex based on hydrogen bonding", Polymer, Elsevier Science Publishers B.V., GB, 3759-3770, vol. 48, No. 13, Jun. 5, 2007.
Nardin, et al., "Hybrid Materials from amphiphilic block copolymers and membrane proteins", Reviews in Molecular Biotechnology, Elsevier, Amsterdam, NL, vol. 90, 17-26, No. 1, Mar. 1, 2002.
Ho, et al., "Block Copolymer-based Biomembranes Functionalized with Energy Transduction Proteins", Biological and Bioinspired Materials and Devices, Apr. 13-16, 2004, Mat. Res. Soc, Symp. Proc., vol. 823, 2004, pp. 187-192.
Soong, et al., "Powering an Inorganic Nanodevice with a Biomolecular Motor", Science, vol. 290, pp. 1555-1558, Nov. 24, 2000.
Cooper, et al., "Adsorption of Frog Foam Nest Proteins at the Air-Water Interface", Biophysical Journal, vol. 88, p. 2114-2125, Mar. 2005.
Mackenzie et al., "Ranasupumin-2: Structure and Function of a Surfactant Protein from the Foam Nests of a Tropical Frog", Biophysical Journal, vol. 96, p. 4984-4992, Jun. 2009.
Nikolov et al., "Ordered Micelle Structuring in Thin Films Formed from Anionic Surfactant Solutions", Journal of Colloid and Interface Science, vol. 133, No. 1, Nov. 1989.
Niewiadomski et al., "Dispersed Oil Impact on Froth Stability in Flotation", Physicochemical Problems of Mineral Processing, vol. 35, p. 5-19, 2001.

\* cited by examiner

*Primary Examiner* — Blaine Lankford
*Assistant Examiner* — David Berke-Schlessel
(74) *Attorney, Agent, or Firm* — Yancy IP Law, PLLC

(57) ABSTRACT

The present invention relates to a method for controlling multi-phase chemical reactions using the architecture of surfactant foams to control mass transport of chemical reactants, catalysts, and products and the kinetics with which they react. More specifically, the invention relates to transformations that require both gaseous and liquid components with dissolved or suspended catalysts that are unstable when sheared.

7 Claims, 1 Drawing Sheet

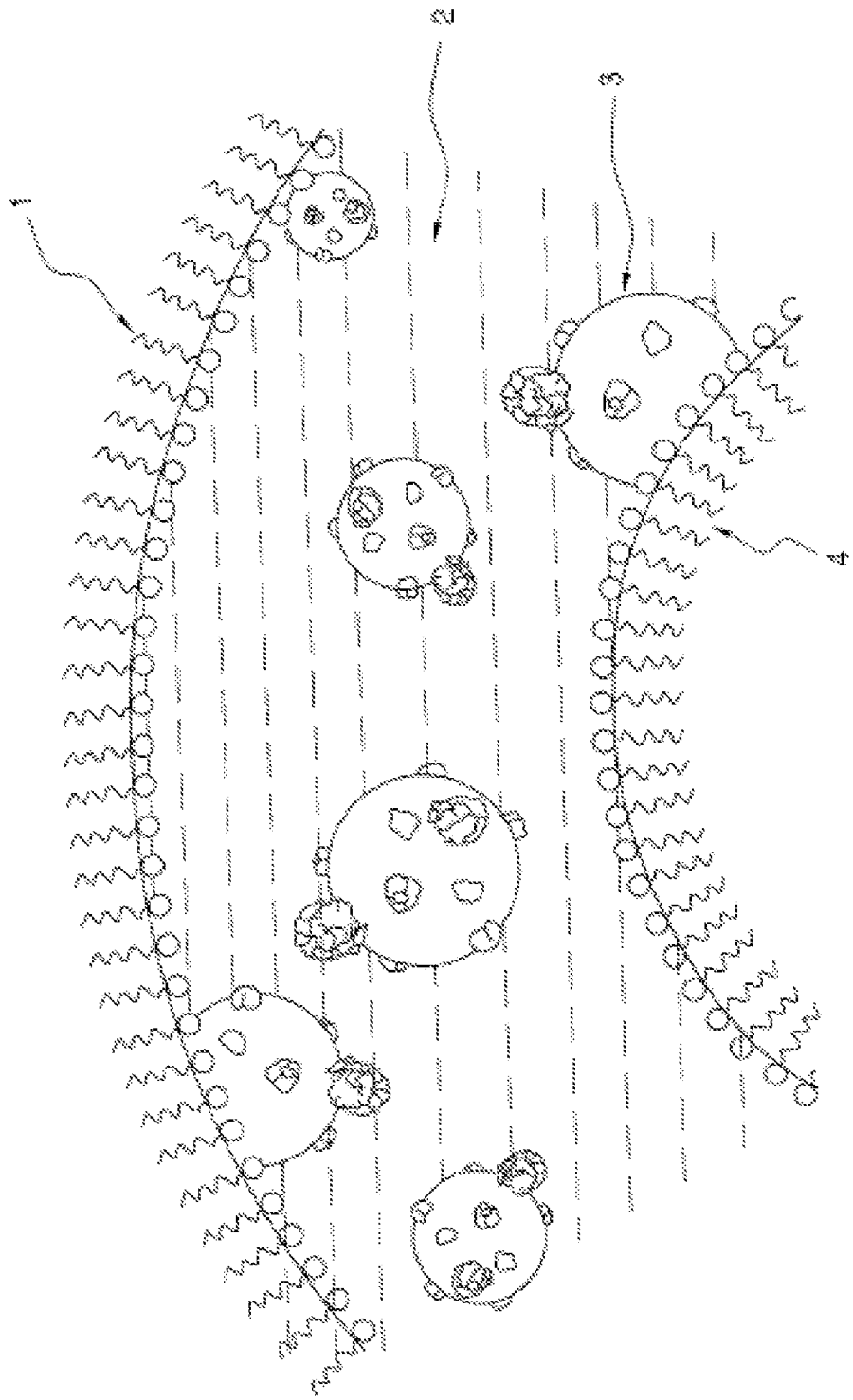

FOAM MICROREACTOR FOR MULTI-PHASE SHEAR-SENSITIVE REACTIONS

CROSS-REFERENCE TO RELATED APPLICATIONS

This Application claims the benefit, under 35 USC 119(e), of U.S. Provisional Application No. 61/476,164 filed Apr. 15, 2011, the contents of which are expressly incorporated herein by reference.

BACKGROUND OF THE INVENTION

1. Field of the invention

The present invention relates to a method for controlling multi-phase chemical reactions using the architecture of surfactant-based foams to control mass transport of chemical reactants, catalysts, and products and the kinetics with which they react. More specifically, the invention relates to transformations that require both gaseous and liquid components with dissolved or suspended reactants that are unstable when sheared.

2. Related Art

Chemical reactions that simultaneously involve gases, liquid solutions, and suspended solids are ubiquitous, particularly in biologically inspired chemistry. Fermenters, incubators, and culture bags have been widely used as bioreactors to grow and manipulate cells; these combine gases such as $O_2$ or $CO_2$, liquids such as water or aqueous solutions, and solids such as suspended proteins, liposomes, and vesicles to enable complex reactions such as photosynthesis or respiration.

A problem with these reactors is that the small surface area defined by the gas-liquid interface constrains the rate of gas transport into the liquid phase. A second problem with the prior art involves the long characteristic diffusion times of gases dissolved in the liquid phase. These problems are partially, not completely, addressed by stirring or by continuously circulating gas bubbles through the liquid. Either method increases the area of the gas-liquid interface and supplements diffusive with convective mixing of the reactants. However, stirring and bubbling generates fluid mechanical shear in the reactive mixture. As is known to those practiced in the art of biochemistry, enzymes are catalysts formed from proteins. The ability of these enzymes to catalyze reactions is crucially dependent on their three-dimensional conformation in solution, and this can be irreversibly altered by fluid dynamical shear of protein suspensions and solutions. For example, lyophilized pharmaceuticals often loose potency when shear produced by vigorous mixing is used. The role of shear in degradation of proteins is thoroughly reviewed by Thomas and Geer, *Effects of Shear on Protein Solutions*, Biotechnology Letters, 33, 443-56 (2011), which is expressly incorporated herein by reference. This rheological instability of the enzymes constrains optimal mixing of reactants and therefore reduces rates and efficiencies for production of desired compounds.

The prior art partially addresses the challenge of component destruction by shear. The component most sensitive to shear (cells), are mechanically filtered from the less sensitive component (broth) in their two chamber bioreactor. The broth is treated with gas by bubbling and stirring, and then remixed with the shear-sensitive component. This approach suffers from three limitations: (i) a two-part reactor and filter are required, (ii) any shear-sensitive component that is not completely separated during filtration will be sheared, (iii) reactions that proceed in the bubbling chamber must produce products that are stable long enough to be convectively pumped back into the main reactor.

Another problem with bubbling is that it often requires addition of surfactants that alter surface tension in the fluid to enable bubble formation. Traditional surfactants and detergents often interfere with lipid vesicles, membranes, and proteins, thereby reducing the rates and yields achievable in reactors where they are required. The International Published Application WO 2006/089245 is directed to a bubble architecture and method of making such a bubble, the contents of which are expressly incorporated herein by reference. Although this document lists a variety of surfactants that may be used in making a bubble or foam, the Examples are primarily directed to the use of TWEEN-20™, which exemplify the limitations caused by chemical interactions between surfactants and reactants.

Yet another problem with prior art involving bubbles concerns control of the bubble structure for times that are long compared to those required for the desired chemical transformations. When gas is bubbled through a long column, the lifetime of a bubble-liquid interface is governed by buoyancy, viscosity, and surface tension of the fluid as well as the geometry of the column. This lifetime is not explicitly coupled to the timescales required for chemical reaction, a limitation that is overcome in the method of the current invention.

Bubble architectures and methods of making and using such bubble architectures, wherein the bubble architectures are formed using biologically derived surfactant, for example, the protein Ranaspumin-2 and other biologically derived surfactants to create functional materials that mimic cellular physiological processes has been disclosed in International Patent Application PCT/US10/60610 filed on Dec. 15, 2010 claiming priority to U.S. Provisional application No. 61/286,578 filed Dec. 15, 2009, the entire contents of which are expressly incorporated herein by reference.

The foam nest produced by the Tungara frog is one of the largest found in nature. It is used to protect developing tadpoles in terrestrial areas of tropical and subtropical Central America, until maturation or greater water availability. The creation and maintenance of the Tungara frog's foam nest can be attributable to a suite of six proteins called ranaspumins (Rsn1-6). Of these, Rsn2 is responsible for the reduction in water surface tension allowing foam creation upon liquid agitations. The other ranaspumins resist microbial infection and insects, and provide carbohydrate binding to stabilize the foams to drainage and desiccation. Rsn-2 plays the surfactant role very economically at concentrations as low as 0.1 mg/ml, but also has the ability to exist in two conformational states (see Mackenzie, C. D., et al., *Ranaspumin-2; Structure and Function of a Surfactant Protein from the Foam Nests of a Tropical Frog*, Biophysical Journal, 2009, 96(12); p. 4984-4992, which is expressly incorporated herein by reference). When agitated, the protein denatures slightly, allowing the single hydrophobic alpha helix to extend into the air while the hydrophilic beta sheet remains in the water phase. Normally these two regions are folded onto each other, so without agitation or continued bridging of the air-water interface, the protein is most likely to exist as an invert water-soluble protein. The foam nests of the Tungara frog are one example of a protein based foam that is compatible with lipid membranes, yet resistant to environmental factors. Another example of a surfactant protein according to the present invention is Ranasmurfin, which is produced by a Java frog (Oke et al., *Unusual Chromophore and Cross-Links in Ranasmurfin: A Blue Protein from the Foam Nests of a Tropical Frog*, Angew. Chem. Int. Ed. 2008, 47, 7853-7856, which is expressly incorporated herein by reference). The persistence of these foams can be adjusted from minutes to more than three days, the time required for tadpole maturation, by changing concentrations and compositions of the ranaspumin or ranasmurfin proteins. (see Downie, J. R., *Functions of the foam in foam-nesting Leptodactylids: the nest as a posthatching refuge in Physalaemus pustulosus*. Herperol, J 1993. 3: p. 35-42.)

BRIEF SUMMARY OF THE INVENTION

The method of the current invention solves these and other problems associated with multi-phase chemical reactors where shear-sensitive reactants are required. According to this method, a stabilizing surfactant that is unreactive with any of the reactants, intermediates, or products of the required transformation is added to an aqueous suspension of reactants. Reactant gas may be introduced by inflation of the aqueous suspension to form a foam architecture that is mechanically stable for times that are longer than those required for completion of the required chemical reactions. The type and concentration of surfactant and the inflation conditions are selected to ensure foam geometries that enhance the diffusive transport and chemical kinetics needed for effective transformation of reactants to products. This method for combining reactant gas with shear-sensitive aqueous reactants is useful for broad classes of enzymatic reactions such as photosynthesis and respiration, as well and other syntheses familiar to those practiced in the arts of biochemistry and chemical engineering.

BRIEF DESCRIPTION OF THE DRAWING

The features and advantages of the present invention will become apparent from the following detailed description of a preferred embodiment thereof, taken in conjunction with the accompanying drawing, in which:

FIG. 1 is a schematic illustration of a foam architecture in the form of a cell or bubble showing surfactant monolayers (1,4) with hydrophilic (circle) and hydrophobic (squiggly) ends, an aqueous thin film (2, dashes), and suspended reactants (3) in accordance with a preferred embodiment of the present invention.

DETAILED DESCRIPTION OF THE INVENTION

The present invention is directed to a method for controlling multi-phase chemical reactions comprising, a) providing a foam architecture including walls having an aqueous thin film between two layers of stabilized surfactant, wherein said aqueous thin film has at least one dissolved or suspended shear-sensitive aqueous reactant and said foam architecture is formed by inflation with a reactant gas; b) reacting said at least one dissolved or suspended shear-sensitive aqueous reactant with said reactant gas to form at least one intermediate or product; wherein said stabilized surfactant is unreactive with said shear-sensitive aqueous reactant, reactant gas, intermediate and product; and wherein said method accelerates and/or improves the efficiency of the multi-phase chemical reactions over those achieved in bulk liquid.

An essential component of the method according to the present invention is a stabilized surfactant. Surfactant molecules are amphiphilic; they have ends whose solubility in water differs. When a bubble is formed in a solution containing surfactant the hydrophobic ends accumulate at the water-air interface and a monolayer of surfactant envelopes the liquid phase on each side of the bubble as shown schematically in FIG. 1. According to this figure, an aqueous thin film (shown as dashed lines) is in contact with the hydrophilic end of the amphiphilic surfactant (shown as small circles) while the gas on the inside and outside of the bubble is in contact with the hydrophobic end of the surfactant (shown as squiggly lines). While surfactants and bubbles are well known and have been extensively studied for centuries, not all surfactants are suitable for the method of the current invention because they interfere chemically with one or more of the reactants.

In a preferred embodiment, the stabilized surfactant is a protein or mixture of proteins that do not bind or interfere with the precursors, enzymes, or products of a chemical reaction. In another embodiment of the method this stabilized surfactant is one or more of six Ranaspumin proteins that are derived from the Tungara frog or genetically engineered bacterial sources (see Mackenzie, C. D., et al., *Ranaspumin-2; Structure and Function of a Surfactant Protein from the Foam Nests of a Tropical Frog*. Biophysical Journal, 2009. 96(12); p. 4984-4992, which is expressly incorporated herein by reference).

Foam topology arises from surprisingly uniform physical principles and structural elements. The architecture of aqueous foams is mediated by surfactants that stabilize the air-water interface and provide an energetic (both electrostatic and steric) barrier to rupture and collapse. The thickness of the aqueous thin film can be adjusted over a wide range, from a few nanometers to tens of micrometers by controlling the surfactant composition and concentration, the viscosity of the liquid, and other factors familiar to those practiced in the art of chemical physics. These bubbles form tetrahedral structures commonly referred to as plateau junctions. The legs (where two bubbles intersect) and nodes (where three or occasionally four or more bubbles intersect) of the junction that contain the trapped liquid phase are typically 0.01-1 mm wide. The drainage of these channels is a primary constraint on the stability of the foam, so adjustment of the surfactant concentration and composition is accomplished in the present invention to tune the aqueous thin film, leg, and junction dimensions to stabilize the foam for a time $\tau$ that is necessary to complete transformation of reactants to products. This time $\tau$ can be computed for any chemical transformation as two to three times the reciprocal of the velocity for the rate-limiting step in the reaction sequence, which varies with the specific sets of reactions in ways obvious to those practiced in the art of chemical kinetics.

According to the present method the transport of gas through the surfactant layer and into the aqueous thin film is governed by surface area and diffusion. An advantage of the present method is that the thickness of the aqueous thin film is generally less than 100 µm and preferably less than 1 µm. The time constant for diffusion in the fundamental mode is given by $\Lambda^2/D$ where $\Lambda$ is the characteristic length and D is the diffusion coefficient. (see J. Crank, The Mathematics of Diffusion, Oxford University Press, 1975, which is expressly incorporated herein by reference.) When compared to a stirred reactor with a fluid depth of 1 cm the rate of diffusive transport is between $10^4$ and $10^8$ times more rapid in the foam layers than in the bulk solution. Moreover, the surface area of the gas-liquid interface is much greater for the foam than for a slab of bulk liquid. These two facts accelerate transport of gas into and out of the aqueous reaction zone where dissolved and/or suspended reactants participate in the multiphase reaction.

Microfluidic transport of liquid reactants is also accelerated in the persistent foam format because of the topological features of two-dimensional diffusion (see Crank, ibid.) and the importance of surface tension and capillary forces in the fluid dynamics of thin sheets. These vary with the specific fluid properties and dimensions as is obvious to those practiced in the art of chemical engineering, fluid dynamics, rheology, and finite element simulation of fluids.

In one embodiment of the method according to the present invention the reactant gas is $CO_2$, the product gas is $O_2$, the aqueous thin film contains shear-sensitive enzymes, polymersomes, and cofactors required for the Calvin cycle, and the transformation produces glucose. The rate and energetic efficiency of the synthesis is approximately doubled in the foam format using persistent foams based on Rsn-2, as described by Wendell et al., *Artificial Photosynthesis in Ranaspumin-2 Based Foam*, Nano Lett. 2010, 10, 3231-3236, which is expressly incorporated herein by reference.

Although the present invention has been disclosed in terms of a preferred embodiment, it will be understood that numerous additional modifications and variations could be made thereto without departing from the scope of the invention as defined by the following claims:

What is claimed is:

1. A method for controlling multi-phase chemical reactions comprising,
    a) providing a foam architecture including walls having an aqueous thin film between two layers of stabilized surfactant, wherein said stabilized surfactant is one or more proteins produced by foam-nesting frogs, wherein said aqueous thin film has at least one dissolved or suspended shear-sensitive aqueous reactant and said foam architecture is formed by inflation with a reactant gas;
    b) reacting said at least one dissolved or suspended shear-sensitive aqueous reactant with said reactant gas to form at least one intermediate or product;
    wherein said stabilized surfactant is unreactive with said shear-sensitive aqueous reactant, reactant gas, intermediate and product; and
    wherein said method accelerates and/or improves the efficiency of the multi-phase chemical reactions over those achieved in bulk liquid.

2. The method of claim 1 wherein the stabilized surfactant is one or more proteins selected from the set of Ranaspumins and Ranasmurfins.

3. The method of claim 1 wherein the shear-sensitive aqueous reactant is an enzymatic protein with catalytic properties.

4. The method of claim 1 wherein the shear-sensitive aqueous reactant is or contains lipid.

5. The method of claim 1 wherein the shear-sensitive aqueous reactant is or contains a liposome or polymersome.

6. The method of claim 1, wherein the aqueous thin film has a thickness of less than 100 μm.

7. The method of claim 6, wherein the aqueous thin film has a thickness of less than 1 μm.

* * * * *